United States Patent
Lee et al.

(10) Patent No.: US 10,215,224 B1
(45) Date of Patent: Feb. 26, 2019

(54) AIR FOIL BEARING ASSEMBLY

(71) Applicants: Hyundai Motor Company, Seoul (KR); Kia Motors Corporation, Seoul (KR)

(72) Inventors: Chang Ha Lee, Gyeonggi-Do (KR); Hyunyoo Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/822,263

(22) Filed: Nov. 27, 2017

(30) Foreign Application Priority Data

Aug. 23, 2017 (KR) .......................... 10-2017-0106391

(51) Int. Cl.
  *F16C 17/02* (2006.01)
  *F16C 33/10* (2006.01)
(52) U.S. Cl.
  CPC ........ *F16C 17/026* (2013.01); *F16C 33/1015* (2013.01)
(58) Field of Classification Search
  CPC ...................................................... F16C 17/024
  See application file for complete search history.

(56) References Cited

U.S. PATENT DOCUMENTS

| | | | | |
|---|---|---|---|---|
| 4,222,618 A | * | 9/1980 | Miller, Jr. ............. | F16C 17/024 384/202 |
| 4,464,068 A | * | 8/1984 | Potrykus ................. | F16C 17/10 384/103 |
| 4,549,821 A | * | 10/1985 | Kawakami ............ | F16C 17/024 384/103 |
| 5,658,079 A | * | 8/1997 | Struziak ................ | F16C 17/024 384/106 |
| 8,672,549 B2 | * | 3/2014 | Flora ................... | F16C 32/0603 384/103 |
| 2008/0292229 A1 | * | 11/2008 | Dubreuil ............... | F16C 17/024 384/107 |
| 2010/0177997 A1 | * | 7/2010 | Lee ....................... | F16C 17/024 384/91 |
| 2011/0211783 A1 | * | 9/2011 | Ishimoto ............... | F16C 17/024 384/440 |

\* cited by examiner

*Primary Examiner* — Thomas R Hannon
(74) *Attorney, Agent, or Firm* — Mintz Levin Cohn Ferris Glovsky and Popeo, P.C.; Peter F. Corless (57) ABSTRACT

An air foil bearing assembly includes: a bearing housing having a hollow into which a rotary shaft is fitted and having a slot formed in an axial direction on an inner circumference surface of the hollow; a bump foil having a bending end engaged to the slot formed at one end portion, rolled in a circumferential direction inside the hollow, and having a free end of another end portion located on the bending end; a top foil having a bending end engaged to the slot formed at one end portion, rolled in a second circumferential direction inside the bump foil, and having a free end of another end portion located on the bending end; and a stopper provided on each of both sides of the top foil in the circumferential direction and preventing the bump foil from protruding radially outwards from the hollow.

12 Claims, 7 Drawing Sheets

FIG. 7

AIR FOIL BEARING ASSEMBLY

CROSS-REFERENCE TO RELATED APPLICATION

This application claims under 35 U.S.C. § 119(a) the benefit of Korean Patent Application No. 10-2017-0106391 filed in the Korean Intellectual Property Office on Aug. 23, 2017, the entire contents of which are incorporated herein by reference.

BACKGROUND

(a) Technical Field

The present disclosure relates to a journal bearing for a rotating machine, and more particularly, to an air foil bearing assembly for supporting a load of a rotating body as pressure is formed by introducing air between the rotating body and a foil.

(b) Description of the Related Art

Generally, a bearing is a mechanical element that fixes a rotary shaft of a rotating machine at a predetermined position and rotatably supports the shaft while supporting a shaft weight and a load applied to the shaft.

Among different types of bearings, an air foil bearing is a bearing which supports a load by introducing air, which is a fluid having viscosity, between a rotor and the foil which in contact with a bearing disk by high-speed rotation of the rotor (or rotary shaft) to form pressure. Among air foil bearings, an air foil journal bearing is a bearing that is configured to support a radial load in a vertical direction.

The air foil journal bearing has a bump foil provided along a hollow circumference of a bearing housing and a top foil installed inside the bump foil. The rotor (or rotary shaft) is disposed inside the top foil. The rotor rotates in a state in which an outer peripheral surface of the rotor and an inner peripheral surface of the top foil are spaced apart.

The bump foil and the top foil form a bending portion in which a circumferential end portion is bent radially outward. The bending portion is coupled to a slot formed along an axial direction on the inner circumferential surface of the bearing housing. The bending portion allows the bump foil and the top foil to be fixed to the bearing housing without being rotated or pushed in the circumferential direction when the rotor is rotated.

The slot of the bearing housing to which the bending portions of the bump foil and the top foil are engaged is provided in a form in which both axial front and rear sides are closed to prevent axial disengagement of the bump foil and the top foil.

Therefore, in order to assemble the bump foil and the top foil to the bearing housing, the bump foil and the top foil are wound in the circumferential direction and axially inserted into a hollow of the bearing housing, and then the bending portions of the bump foil and the top foil are engaged to the slot in the radial direction of the hollow. Therefore, by coupling the bending portions of the bump foil and the top foil to the slot in which both axial front and rear sides are closed, the bump foil and the top foil can be fixed to the bearing housing without being diverted to both axial front and rear sides while the rotary shaft is driven.

In particular, the bump foil is formed by a thin foil, one end of which is fixed to the slot of the bearing housing by the bending portion as a fixed end and the other end is formed by a free end.

However, in the related art, when the rotating machine is in operation, the bump foil and the top foil are aligned with each other in the axial direction and the rotation of the rotary shaft is supported, but when external excitation or impact is repeatedly applied, a problem occurs in which a bump foil having a relatively small thickness is protruded to a hollow outer side (both axial front and rear sides) of the bearing housing.

Therefore, in the related art, when the bumper foil protrudes to the hollow outside of the bearing housing during operation of the rotating machine, the protruding portion collides with the rotary shaft, which may adversely affect operation of the rotating machine.

The above information disclosed in this Background section is only for enhancement of understanding of the background of the disclosure and therefore it may contain information that does not form the prior art that is already known in this country to a person of ordinary skill in the art.

SUMMARY

The present disclosure provides an air foil bearing assembly which can prevent a bump foil having a relatively small thickness from being displaced from a fixed position by external excitation or impact.

An exemplary embodiment of the present disclosure provides an air foil bearing assembly including: i) a bearing housing having a hollow into which a rotary shaft is fitted and having a slot formed in an axial direction on an inner circumference surface of the hollow; ii) a bump foil having a bending end engaged to the slot formed at one end portion, rolled in a circumferential direction inside the hollow, and having a free end of another end portion located on the bending end; iii) a top foil having a bending end engaged to the slot formed at one end portion, rolled in a second circumferential direction inside the bump foil, and having a free end of another end portion located on the bending end; and iv) a stopper provided on each of both sides of the top foil in the circumferential direction and preventing the bump foil from protruding radially outwards from the hollow.

The stopper may support both of the end portions of the bump foil inside the hollow of the bearing housing.

The stopper may be integrally formed at both circumferential sides on the bending end of the top foil.

The stopper may be formed to protrude in a radial direction of the hollow from both of the end portions on the bending end of the top foil.

The stopper may be extended with a set width in the axial direction on both of the end portions on the bending end of the top foil and formed to be bent in the radial direction of the hollow.

The stopper may support both of the end portions of the bump foil on the free end of the bump foil.

The bump foil may have a plurality of elastic bumps which protrudes to be convex in the radial direction of the hollow in the circumferential direction, and.

The stopper may be provided with a width overlapping with two to four elastic bumps.

A height of the stopper may satisfy 50 to 100% of the height of the elastic bump.

The stopper may have at least one groove.

The groove may have a "V" shape.

The top foil may have a larger thickness than the bump foil.

The bump foil may have at least one incision line in the circumferential direction at a part excluding the bending end.

Another exemplary embodiment of the present disclosure provides an air foil bearing assembly including: i) a bearing housing having a hollow into which a rotary shaft is fitted and having a slot formed in an axial direction on an inner circumference surface of the hollow; ii) a bump foil having a bending end engaged to the slot formed at one end portion, rolled in a circumferential direction inside the hollow, and having a free end of another end portion located on the bending end; iii) a top foil having a bending end engaged to the slot formed at one end portion, rolled in a second circumferential direction inside the bump foil, and having a free end of another end portion located on the bending end; and iv) a stopper provided on each of both ends of the inner circumferential surface of the hollow of the bearing housing and preventing the bump foil from protruding radially outwards from the hollow.

A supporting groove supporting the bump foil may be formed on the inner circumferential surface of the hollow of the bearing housing.

The stopper may be provided as a step on both ends of the supporting groove.

The bump foil may have a plurality of elastic bumps which protrudes to be convex in the radial direction of the hollow in the circumferential direction.

The step may support the elastic bumps.

The step may be formed in a height corresponding to a thickness of the bump foil.

BRIEF DESCRIPTION OF THE DRAWINGS

These drawings are for the purpose of describing an exemplary embodiment of the present disclosure, and therefore the technical spirit of the present disclosure should not be construed as being limited to the accompanying drawings.

DETAILED DESCRIPTION OF THE EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

The drawings and description are to be regarded as illustrative in nature and not restrictive and like reference numerals designate like elements throughout the specification.

Since size and thickness of each component illustrated in the drawings are arbitrarily represented for convenience in explanation, the present disclosure is not particularly limited to the illustrated size and thickness of each component and the thickness is enlarged and illustrated in order to clearly express various parts and areas.

Figure 1:
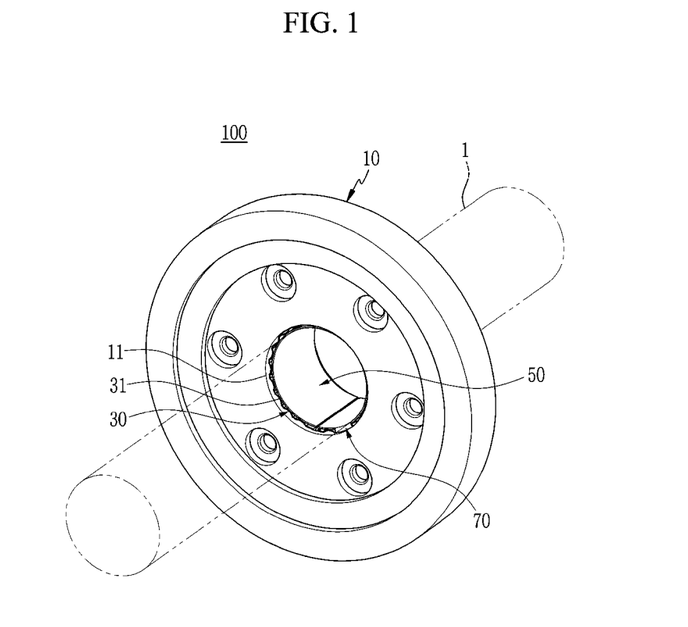
FIG. 1 is a perspective view illustrating an air foil bearing assembly according to an exemplary embodiment of the present disclosure.
Figure 2:
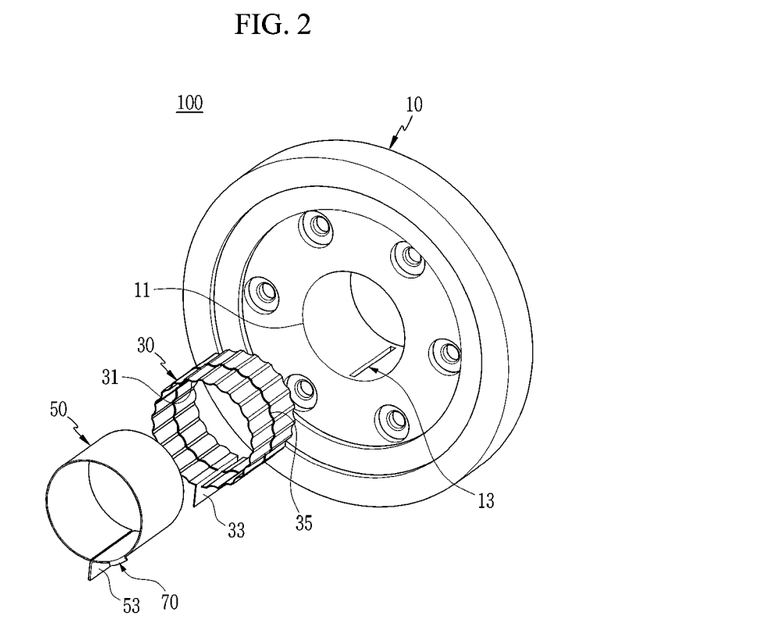
FIG. 2 is an exploded perspective view illustrating the air foil bearing assembly according to the exemplary embodiment of the present disclosure.

FIG. 1 is a perspective view illustrating an air foil bearing assembly according to an exemplary embodiment of the present disclosure and FIG. 2 is an exploded perspective view illustrating the air foil bearing assembly according to the exemplary embodiment of the present disclosure.

Referring to FIGS. 1 and 2, the air foil bearing assembly 100 according to the exemplary embodiment of the present disclosure is configured in a rotating machine having a rotary shaft 1 (also referred to as a "rotor" in the art) as a rotating body.

The air foil bearing assembly 100 supports a weight of the rotary shaft 1 and a load applied to the rotary shaft 1 in the rotating machine and serves to rotatably support the rotary shaft 1.

Further, the air foil bearing assembly 100 according to the exemplary embodiment of the present disclosure may be constituted by a journal bearing supporting a radial load perpendicular to an axial direction of the rotary shaft 1 in the rotary machine.

The air foil bearing assembly 100 described above is effective for supporting the rotary shaft 1 rotating at a high speed. For example, the air foil bearing assembly 100 may be applied to the rotary shaft 1 rotating at the high speed in the rotating machine such as a turbo compressor, a turbo cooler, a turbo generator, an air compressor, an air blower, or the like adopted in a vehicle.

However, a scope of the present disclosure should not be construed as being limited to being applied to the rotating machine in the field of automobiles, and the technical spirit of the present disclosure can be applied to rotating machines of various types and applications.

In the exemplary embodiment of the present disclosure, the axial direction of the rotary shaft 1 is defined as a front-rear direction, a direction perpendicular to the axial direction is defined as a radial direction, and a surface positioned on a front side is defined as a front surface and a surface positioned on a rear side is defined as a rear surface.

The definition of the direction is a relative meaning and the direction may vary depending on a reference position of the rotary shaft 1 and an assembling position of the bearing assembly. Therefore, the reference direction is not particularly limited to the reference direction of the exemplary embodiment.

In addition, hereinafter, the term "end" may be defined as either end and may be defined as a certain portion (end portion) including the end.

The exemplary embodiment of the present disclosure provides an air foil bearing assembly which may prevent a foil component having a relatively small thickness from being displaced from a fixed position by external excitation or impact with a simple structure.

To this end, the air foil bearing assembly 100 according to the exemplary embodiment of the present disclosure includes a bearing housing 10, a bump foil 30, a top foil 50, and a stopper 70.

In the exemplary embodiment of the present disclosure, the bearing housing 10 has a front and rear assembling surface to be assembled to the rotating machine, and has a hollow 11 into which the rotary shaft 1 of the rotating machine is inserted.

The bearing housing 10 has a slot 13 in a front and rear direction in the axial direction on the inner peripheral surface of the hollow 11 in order to mount the bump foil 30 and the top foil 50 to be further described below. In particular, the slot 13 is provided in a form in which one side is closed on the front surface of the bearing housing 10 and the other side is closed on the rear surface.

In the exemplary embodiment of the present disclosure, the bump foil 30 is installed inside the hollow 11 of the bearing housing 10 and is disposed in close contact with the inner peripheral surface of the hollow 11. The bump foil 30 is provided in a thin plate shape having a thickness (for example, 0.1 to 0.2 mm). The bump foil 30 has a plurality of elastic bumps 31 protruding inward in a circular shape. The elastic bumps 31 protrude to be convex in the radial direction of the hollow 11 in the circumferential direction of the bump foil 30, that is, the inner circumferential direction of the hollow 11 in the radial direction of the hollow 11.

The bump foil 30 has a bending end 33 at one end thereof coupled to the slot 13 of the bearing housing 10. The bending end 33 is provided as a flat plate portion bent radially outward at one end of the bump foil 30.

The bump foil 30 is rolled in a circumferential direction from the inside of the hollow 11 while the bending end 33 is engaged to the slot 13 and has a free end as the other end on the side of the bending end 33.

Further, the bump foil 30 has at least one incision line 35 in the circumferential direction at a portion excluding the bending end 33 to control rigidity. For example, the incision line 35 is formed in a single number in the circumferential direction at the center of the portion excluding the bending end 33.

In the exemplary embodiment of the present disclosure, the top foil 50 is installed inside the bump foil 30 and is disposed in close contact with the elastic bumps 31 of the bump foil 30.

The top foil 50 has a bending end 53 at one end thereof coupled to the slot 13 of the bearing housing 10. The bending end 53 is provided as the flat plate portion bent radially outward at one end of the top foil 50.

The top foil 50 is rolled in a second circumferential direction (a direction opposite to a rolling direction of the bump foil) from the inside of the hollow 11 while the bending end 53 is engaged to the slot 13 and has the free end as the other end on the side of the bending end 53.

In particular, the top foil 50 has a relatively larger thickness than the bump foil 30. The rotary shaft 1 may be inserted through the inside of the top foil 50 so as to penetrate the top foil 50. In this case, the rotary shaft 1 may be disposed to be spaced on the inner side of the top foil 50.

In the exemplary embodiment of the present disclosure, the stopper 70 prevents the bump foil 30 having a relatively small thickness from being displaced from the fixed position due to external excitation or impact when the rotating machine is operated. That is, the stopper 70 serves to prevent the bump foil 30 from protruding axially outward (both front and rear sides) from the hollow 11 of the bearing housing 10 during operation of the rotating machine.

The stopper 70 is provided on each of both sides in the circumferential direction (both edges in the circumferential direction) of the top foil 50 in the exemplary embodiment of the present disclosure. The stopper 70 is integrally formed on both sides in the circumferential direction on the bending end 53 side of the top foil 50. The stopper 70 protrudes in the radial direction of the hollow 11 from both ends in the circumferential direction on the bending end 53 side of the top foil 50. The stopper 70 supports both ends of the bump foil 30 in the circumferential direction inside the hollow 11 of the bearing housing 10.

Specifically, the stopper 70 according to the exemplary embodiment of the present disclosure extends in the axial direction at both ends in the circumferential direction on the bending end 53 side of the top foil 50.

That is, the stopper 70 extends to both sides in the axial direction (forward and backward directions) from both ends in the circumferential direction on the side of the bending end 53 of the top foil 50 and has a fin bent in the radial direction of the hollow 11. The stopper 70 supports both ends in the circumferential direction of the bump foil 30 inside the hollow 11 and thus supports both ends in the circumferential direction of the bump foil 30 at the free end side of the bump foil 30.

Figure 3:
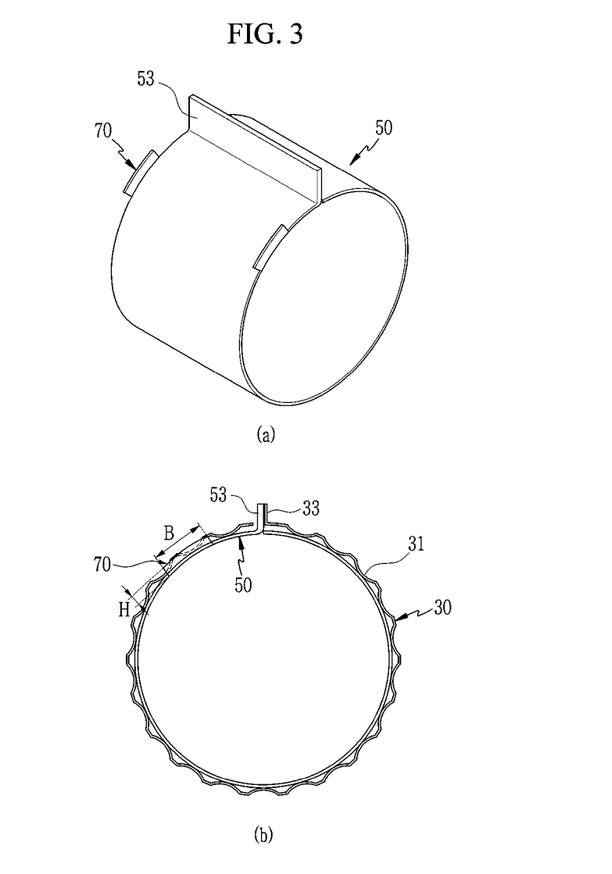
FIG. 3 is a diagram illustrating a top foil applied to the air foil bearing assembly according to the exemplary embodiment of the present disclosure.

As illustrated in FIG. 3, the stopper 70 has a width B overlapping two to four elastic bumps 31 at the free end side of the bump foil 30 and a height H satisfying 50 to 100% of the heights of the elastic bumps 31.

In particular, in the case where the width B of the stopper 70 is set so as to overlap with the one elastic bump 31, the stopper 70 may not support the bump foil 30 which protrudes axially outwards from the hollow 11 of the bearing housing 10 by the external excitation or impact and may allow the bump foil 30 from being protruded while being deformed outward in the axial direction when the rotating machine is operated In the case where the width B of the stopper 70 is set so as to overlap with five or more elastic bumps 31, when the top foil 50 is circularly rolled and installed inside the bump foil 30, the top foil 50 may not be circularly rolled by the stopper 70, thereby causing an assembly failure in which the top foil 50 is not in close contact with the elastic bumps 31 of the bump foil 30.

In addition, when the height H of the stopper 70 is set to be less than 50% of the height of the elastic bumps 31, the bump foil 30 deviates the stopper 70 from the hollow 11 of the bearing housing 11 to protrude axially outwards by the external excitation or impact when the rotating machine is operated.

When the height H of the stopper 70 is set to be more than 100% of the height of the elastic bumps 31, the assembling failure may be caused, in which the top foil 50 is not in close contact with the inner circumferential side of the bump foil 30.

Hereinafter, an assembling method and an operation of the air foil bearing assembly 100 according to the exemplary embodiment of the present disclosure, which is configured as above will be described in detail with the above disclosed drawings.

First, in the exemplary embodiment of the present disclosure, while the bump foil 31 is made to be circular in one direction, the bump foil 30 is located inside the hollow 11 of the bearing housing 10 and the bending end 33 of the bump foil is engaged to the slot 13.

Therefore, while the bending end 33 is engaged to the slot 13, the bump foil 30 is in close contact with the inner circumferential surface of the hollow 11 of the bearing housing 10 and while the bump foil 30 is rolled in a circumferential direction, the free end is located on the bending end 33.

Then, in the exemplary embodiment of the present disclosure, while the top foil 50 is circularly rolled in the second direction, the top foil 50 is located inside the bump foil 30 and the bending end 53 of the top foil 50 is engaged to the slot 13.

Therefore, while the bending end 53 of the top foil 50 is engaged to the slot 13, the top foil 50 is in close contact with the elastic bumps 31 inside the bump foil 30, and while the top foil 50 is rolled in the second circumferential direction, the free end is located on the bending end 53.

In particular, the stopper 70 of the top foil 50 is located on the free end side of the bump foil 30 and supports both ends of the bump foil 30 in the circumferential direction. The stopper 70 extends to both sides in the axial direction (front and rear direction) from both ends in the circumferential direction on the side of the bending end 53 of the top foil 50 and has a shape of the fin bent in the radial direction of the hollow 11 and supports both circumferential ends (i.e., end portions) of the bump foil 30 inside the hollow 11.

Accordingly, in the exemplary embodiment of the present disclosure, the bump foil 30 having a relatively small thickness may be prevented from protruding axially outward (both front and rear sides) from the hollow 11 of the bearing housing 10 by the external excitation or impact during operation of the rotating machine by the stopper 70 of the top foil 50.

Thus, in the exemplary embodiment of the present disclosure, a problem that the bump foil 30 protrudes outside the hollow 11 of the bearing housing 10 and collides with the rotary shaft 1 may be solved and rotation support performance of the rotating shaft 1 may be further enhanced.

Meanwhile, the top foil 50 described above may be processed through a mold. In the exemplary embodiment of the present disclosure, a strip-shaped raw material is formed with a portion extending outwardly from both edge portions in the longitudinal direction and the extended portion is bent upward to configure the stopper 70 having a width and a height which are set.

However, when the top foil 50 is provided inside the bump foil 30 in a circular state, it may not be easy to round the top foil 50 by the stopper 70.

Figure 4:
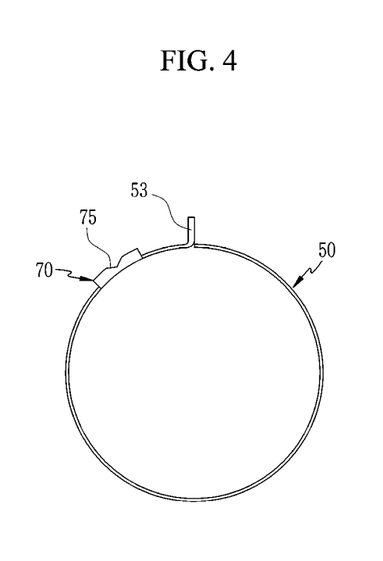
FIG. 4 is a diagram illustrating a modified example of a stopper applied to the air foil bearing assembly according to the exemplary embodiment of the present disclosure.

In order to prevent the problem, the stopper 70 according to the exemplary embodiment of the present disclosure may include at least one groove 75 as a modified example illustrated in FIG. 4. For example, the groove 75 may have a "V" shape.

Therefore, by forming the V-shaped groove 75 in the stopper 70, ease of assembling the top foil 50 to the bearing housing 10 may be further enhanced in the exemplary embodiment of the present disclosure.

Figure 5:
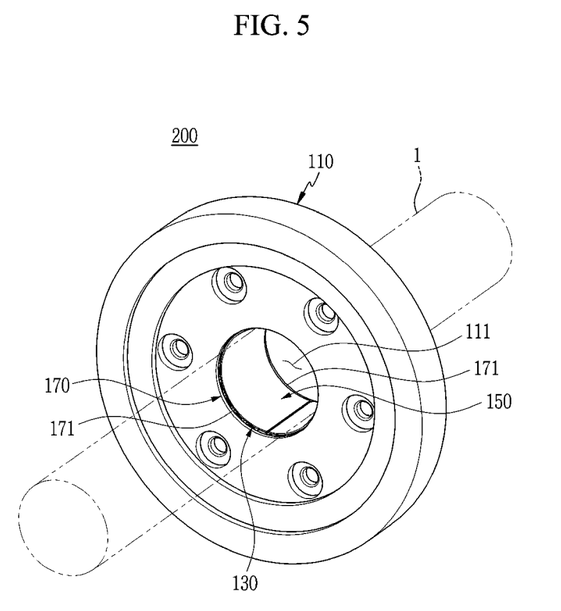
FIG. 5 is a perspective view illustrating an air foil bearing assembly according to another exemplary embodiment of the present disclosure.
Figure 6:
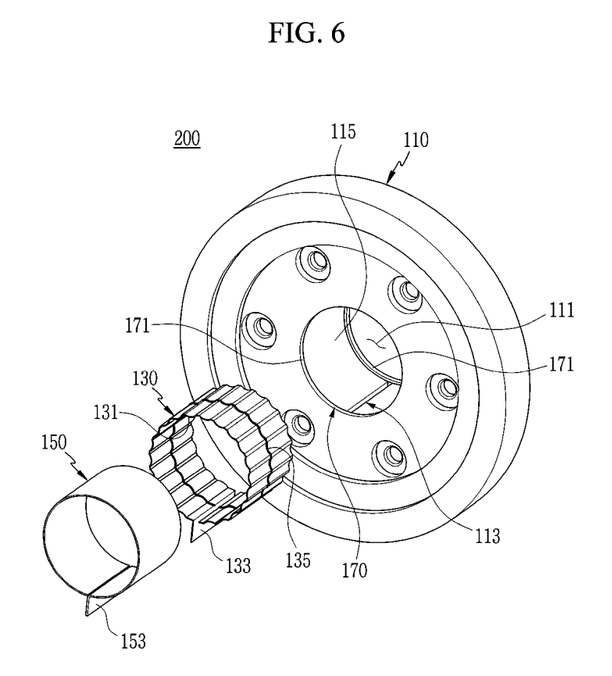
FIG. 6 is an exploded perspective view illustrating the air foil bearing assembly according to another exemplary embodiment of the present disclosure.
Figure 7:
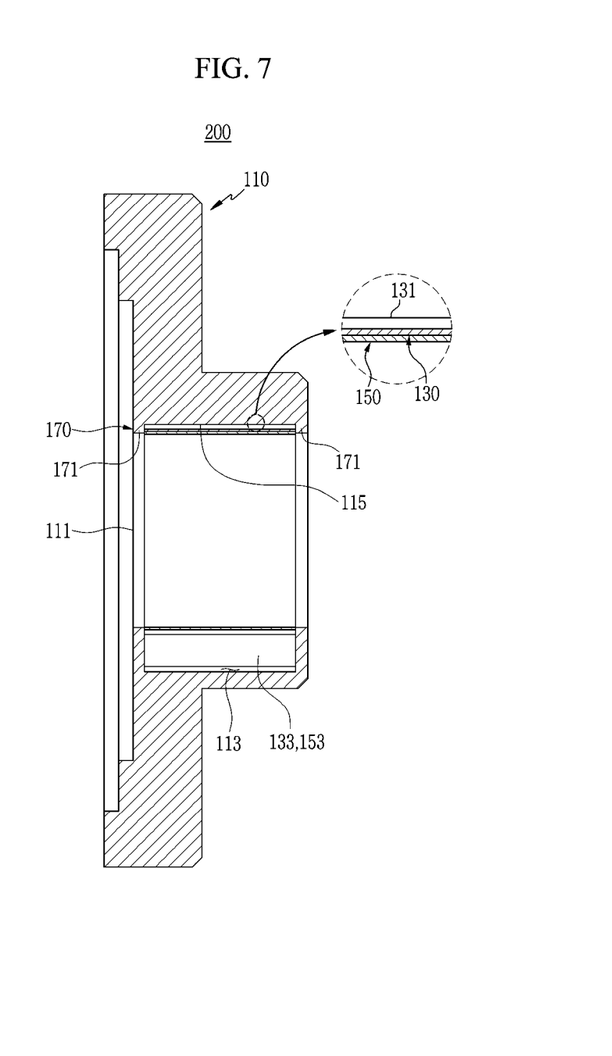
FIG. 7 is a cross-sectional configuration diagram illustrating the air foil bearing assembly according to another exemplary embodiment of the present disclosure.

FIG. 5 is a perspective view illustrating an air foil bearing assembly according to another exemplary embodiment of the present disclosure, FIG. 6 is an exploded perspective view illustrating the air foil bearing assembly according to another exemplary embodiment of the present disclosure, and FIG. 7 is a cross-sectional configuration diagram illustrating the air foil bearing assembly according to another exemplary embodiment of the present disclosure.

Referring to FIGS. 5 to 7, in the air foil bearing assembly 200 according to another exemplary embodiment of the present disclosure, a stopper 170 for preventing a bump foil 130 from protruding axially outward from a hollow 111 of a bearing housing 110 may be provided on both ends of the inner circumferential surface of the hollow 111 of the bearing housing 110.

The bump foil 130 includes elastic bumps 131, a bending end 133, and an incision line 135 as described in the above exemplary embodiment and in the exemplary embodiment of the present disclosure, a top foil 150 includes a bending end 153. Since the configurations of the bump foil 130 and the top foil 150 are the same as those described in the above-mentioned exemplary embodiment, a more detailed description thereof will be omitted below.

In the exemplary embodiment of the present disclosure, the bearing housing 110 has a supporting groove 115 having a supporting surface for supporting the bump foil 130 on the inner circumferential surface of the hollow 111 and has a slot 113 at the supporting groove 115 in the front and rear direction in the axial direction.

In the exemplary embodiment of the present disclosure, the stopper 170 is provided on both ends of the inner circumferential surface of the hollow 111 of the bearing housing 110 and is provided as a step 171 on both ends of the supporting groove 115.

The step 171 is provided as a step portion on an inner circumference of the hollow 111 for partitioning the support groove 115 by forming the supporting groove 115 for supporting the bump foil 130 on the inner circumferential surface of the hollow 111 of the bearing housing 110.

In particular, the step 171 supports both ends of the bump foil 130 in the circumferential direction and supports the elastic bumps 131 of the bump foil 130. The step 171 may be formed at a height corresponding to the thickness of the bump foil 130.

Hereinafter, the assembling method and the operation of the air foil bearing assembly 200 according to another exemplary embodiment of the present disclosure, which is configured as above will be described in detail with the above disclosed drawings.

First, in the exemplary embodiment of the present disclosure, while the bump foil 130 is made to be circular in one direction, the bump foil 130 is located inside the hollow 111 of the bearing housing 110 and the bending end 133 of the bump foil 130 is engaged to the slot 113 of the supporting groove 115.

Therefore, while the bending end 133 is engaged to the slot 113, the bump foil 130 is in close contact with the supporting surface of the supporting groove 115 on an inner circumference of the hollow 111 of the bearing housing 110 and while the bump foil 130 is rolled in a circumferential direction, the free end is located on the bending end 133.

Then, in the exemplary embodiment of the present disclosure, while the top foil 150 is circularly rolled in the second direction, the top foil 150 is located inside the bump foil 130 and the bending end 153 of the top foil 150 is engaged to the slot 115 of the supporting groove 115.

Therefore, while the bending end 153 of the top foil 150 is engaged to the slot 113, the top foil 150 is in close contact with the elastic bumps 131 inside the bump foil 130 and while the top foil 150 is rolled in the second circumferential direction, the free end is located on the bending end 153.

In particular, the stopper 170 supports both ends of the bump foil 130 in the circumferential direction through the step 171 on both ends of the supporting groove 115.

Accordingly, in the exemplary embodiment of the present disclosure, the bump foil 130 having a relatively small thickness may be prevented from protruding axially outward (both front and rear sides) from the hollow 111 of the bearing housing 110 by the external excitation or impact during operation of the rotating machine by the stopper 171 of the top foil 170.

The exemplary embodiment of the present disclosure, a problem that the bump foil protrudes outside the hollow of the bearing housing and collides with the rotary shaft may be solved and rotation support performance of the rotary shaft 1 may be further enhanced.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. An air foil bearing assembly, comprising:
a bearing housing having a hollow into which a rotary shaft is fitted and having a slot formed in an axial direction on an inner circumference surface of the hollow;
a bump foil having a bending end engaged to the slot formed at one end portion, rolled in a circumferential direction inside the hollow, and having a free end of another end portion located on the bending end;
a top foil having a bending end engaged to the slot formed at one end portion, rolled in the second circumferential direction inside the bump foil, and having the free end of another end portion located on the bending end; and
a stopper provided on each of both sides of the top foil in the circumferential direction and preventing the bump foil from protruding radially outwards from the hollow.

2. The air foil bearing assembly of claim 1, wherein the stopper supports both of the end portions of the bump foil inside the hollow of the bearing housing.

3. The air foil bearing assembly of claim 1, wherein the stopper is integrally formed at both of the end portions on the bending end of the top foil.

4. The air foil bearing assembly of claim 1, wherein the stopper is formed to protrude in a radial direction of the hollow from both of the end portions on the bending end of the top foil.

5. The air foil bearing assembly of claim 1, wherein the stopper is extended with a set width in the axial direction on both of the end portions on the bending end of the top foil and formed to be bent in the radial direction of the hollow.

6. The air foil bearing assembly of claim 5, wherein the stopper supports both of the end portions of the bump foil on the free end of the bump foil.

7. The air foil bearing assembly of claim 5, wherein:
the bump foil has a plurality of elastic bumps which protrudes to be convex in the radial direction of the hollow in the circumferential direction, and
the stopper is provided with a width overlapping with two to four elastic bumps.

8. The air foil bearing assembly of claim 7, wherein:
a height of the stopper satisfies 50 to 100% of a height of the elastic bump.

9. The air foil bearing assembly of claim 1, wherein the stopper is extended with a set width in the axial direction on both of the end portions on the bending end of the top foil and formed to be bent in the radial direction of the hollow, and has at least one groove.

10. The air foil bearing assembly of claim 9, wherein:
the groove has a "V" shape.

11. The air foil bearing assembly of claim 1, wherein:
the top foil has a larger thickness than the bump foil.

12. The air foil bearing assembly of claim 1, wherein the bump foil has at least one incision line in the circumferential direction at a part excluding the bending end.

* * * * *